United States Patent Office.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

FERTILIZER.

SPECIFICATION forming part of Letters Patent No. 341,963, dated May 18, 1886.

Application filed August 4, 1885. Serial No. 173,541. (Specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in Antiseptic and Insecticide Fertilizers, which are fully set forth in the following specification.

Heretofore in the manufacture of fertilizers from the waste tank-waters produced in the rendering of meats and fatty substances a product has been obtained at 300° to 350° Fahrenheit, being a brown brittle substance which, before exposure to the action of the atmosphere, can be reduced to a powder; but upon exposure to atmospheric influences it again becomes viscid and deliquescent, and is therefore unsuitable as an article of commerce, the degree of heat employed in its production being insufficient to decompose the albuminoids, without which their viscidity and deliquescence cannot be destroyed.

My object is to produce an improved concentrated antiseptic insecticide fertilizer free from viscidity and deliquescence, and I have found that by continuing the heat above 350° Fahrenheit this above-mentioned brown solid becomes a dry and stiffened mass, which, as the heat advances beyond 400° Fahrenheit, liquefies to a consistency similar to hot tar, which, when the heat is carried to 450° to 480° Fahrenheit, and there continued for about three and one-half to four hours, produces a substance which, while hot, is capable of flowing out of the vessel in which it is prepared, but when cold it resembles asphalt, is brittle, and easy of pulverization.

My invention will be fully understood by the following description and claim; and it consists in manufacturing from the aforesaid tank-waters, (which are usually produced under a high pressure and temperature,) by the application of a decomposing degree of heat, a concentrated antiseptic insecticide fertilizer free from deliquescent and viscid properties, having carbolic acid uniformly distributed throughout its mass, this carbolic acid being formed from the original constituents of said liquids by the chemical changes produced in the process of its manufacture, together with nitrogenous substances in largely-increased quantity, obtained by driving off the more volatile compounds, but leaving in the material the largest part of its nitrogen, thereby increasing the nitrogen ratio from twenty-five to fifty per cent. In doing this proportionate quantities of nitrogen will be released, varying, however, according to the character of the liquids treated and the quality of the fertilizer to be produced. When the nitrogenous products begin to pass over, the material liquefies permanently, losing its viscidity and undue deliquescence.

In the manufacture of this product I first evaporate these tank-liquids until they contain twenty to twenty-five per cent. of moisture, which product I subject to a degree of heat sufficient to decompose their original albuminoids, continuing such heat until all the deliquescent products of decomposition are driven off, when its viscidity and deliquescence will be permanently destroyed and can never be restored, as in the case of the brown fertilizer first above mentioned.

My product first becomes solid at a temperature of 300° to 350° Fahrenheit, and as the heat is advanced the mass becomes dry and stiff until the temperature reaches the decomposing-point—about 380° Fahrenheit—beyond which liquefaction begins, and the deliquescent and viscid compounds commence to separate themselves, the heat meanwhile being raised to about 460° Fahrenheit, and so continued for three and one-half to four hours for about four inches thick of material. By this treatment of the material there is driven off from twenty-five to fifty per cent. of the nitrogen contained in these liquids, thus producing a concentrated product having a higher percentage of nitrogen than these tank-waters originally contained, and which can be melted without decomposition, thereby proving that the original albuminoids have been completely decomposed into new products not decomposable at a temperature ordinarily affecting such albuminoids, while it has also obtained the property necessary for the absorption of ammonia, thus preventing a too rapid escape of nitrogen during the period of fermentation in the soil. The original constituents of these tank-waters are thus changed into less complicated molecular structures, such as amines, salts of ammonia, and phenols. Carbolic acid, one of the phenols produced during the gradual decomposition of the original albuminoids, is consequently intimately mixed with the general mass, thus constituting a homogeneous compound, the phenols of which are always in the presence of ammonia compounds whose neutralizing effect renders accidents to plants impossible, while at the same time their antiseptic and insecticide properties are preserved. Substantially the same results may be obtained by varying the degree of heat, length of time, and thickness of material; but the degree of heat must be always such as will produce decomposition and liquefaction of the material.

What I claim is—

The above-described non-viscid and non-deliquescent fertilizer, consisting of concentrated and partially-decomposed tank-wastes containing carbolic acid and other phenols without the addition or artificial mixture of said phenols.

JOSEPH VAN RUYMBEKE.

Witnesses:
WM. ZIMMERMAN,
J. D. DEAHOFE.